United States Patent
Welch et al.

(10) Patent No.: US 6,862,540 B1
(45) Date of Patent: Mar. 1, 2005

(54) SYSTEM AND METHOD FOR FILLING GAPS OF MISSING DATA USING SOURCE SPECIFIED DATA

(75) Inventors: Henry L. Welch, Grafton, WI (US); John E. Seem, Glendale, WI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 10/396,953

(22) Filed: Mar. 25, 2003

(51) Int. Cl.[7] .......................... G01L 1/00; G01M 1/38; G08B 23/02

(52) U.S. Cl. .......................... 702/44; 702/61; 700/276; 340/870.02

(58) Field of Search .............................. 702/44, 60, 61, 702/182; 700/276; 340/870.02; 300/870.02

(56) References Cited

U.S. PATENT DOCUMENTS

| | | | |
|---|---|---|---|
| 4,990,893 A | | 2/1991 | Kiluk .......................... 340/573 |
| 5,555,195 A | | 9/1996 | Jensen et al. .......... 364/551.01 |
| 5,566,084 A | * | 10/1996 | Cmar .......................... 700/276 |
| 5,889,799 A | * | 3/1999 | Grossman et al. ..... 379/266.08 |
| 6,122,603 A | * | 9/2000 | Budike, Jr. ................. 702/182 |
| 6,424,929 B1 | | 7/2002 | Dawes ....................... 702/179 |
| 6,560,597 B1 | * | 5/2003 | Dhillon et al. ................. 707/4 |
| 6,616,759 B2 | * | 9/2003 | Tanaka et al. ................ 118/63 |
| 2001/0020219 A1 | | 9/2001 | Kishlock et al. ............. 702/61 |
| 2002/0191024 A1 | * | 12/2002 | Huneycutt .................. 345/772 |
| 2003/0014205 A1 | | 1/2003 | Tabor .......................... 702/84 |
| 2003/0061249 A1 | | 3/2003 | Ramaswamy et al. ...... 708/136 |

FOREIGN PATENT DOCUMENTS

WO  WO 9321587 A2 * 10/1993 ........... G06F/15/18

OTHER PUBLICATIONS

Carey et al., "Resistant and Test–Based Outlier Rejection: Effects on Gaussian One– and Two–Sample Inference" Technometrics, vol. 39, No. 3., Aug. 1997.

Sematech, "The Engineering Statistics Internet (ESI) Handbook: Grubbs' Test for Outliers.".

* cited by examiner

Primary Examiner—Michael Nghiem
Assistant Examiner—Meagan S Walling
(74) Attorney, Agent, or Firm—Foley & Lardner LLP

(57) ABSTRACT

A method and apparatus are provided for filling a gap of missing data using source specified data. The method includes analyzing a first set of data representative of utility consumption for a plurality of days to determine clusters of days of the week having similar utility consumption. The method further includes generating an individual profile of utility consumption for each cluster, and copying data from at least one individual profile into the gap to form a second set of data without any gaps. A system for filling a gap of missing data using source specified data includes a microprocessor programmed to copy data from at least one individual profile into the gap, and to adjust the copied data up or down to account for local trend information adjacent to the gap.

62 Claims, 3 Drawing Sheets

SYSTEM AND METHOD FOR FILLING GAPS OF MISSING DATA USING SOURCE SPECIFIED DATA

FIELD OF THE INVENTION

The present invention relates to methods and systems for analyzing consumption of utilities, such as electricity, natural gas and water, and more particularly to methods and systems for filling gaps in consumption usage data.

BACKGROUND OF THE INVENTION

Large buildings often incorporate computerized control systems which manage the operation of different subsystems, such as for heating, ventilation and air conditioning. In addition to ensuring that the subsystems perform as desired, the control system operates the associated equipment as efficiently as possible.

A large entity may have numerous buildings under common management, such as on a university campus or a chain of stores located in different cities. To accomplish this, the controllers in each building gather data regarding performance of the building subsystems so that the data can be analyzed at the central monitoring location.

With the cost of energy increasing, facility owners are looking for ways to manage and conserve utility consumption. In addition, the cost of electricity for large consumers may be based on the peak use during a billing period. Thus, high consumption of electricity during a single day or billing increment can affect the rate at which the service is billed during an entire month or longer. Moreover, certain preferential rate plans require a customer to reduce consumption upon the request of the utility company, such as on days of large service demand throughout the entire utility distribution system. Failure to comply with the request usually results in stiff monetary penalties which raises the energy cost significantly above that for an unrestricted rate plan. Therefore, a consumer must have the ability to analyze energy usage data to determine the best rate plan and implement processes to ensure that operation of the facility does not inappropriately cause an increase in utility costs.

The ability to analyze energy consumption or usage data is particularly important for consumers that subscribe to real-time pricing (RTP) structures. With RTP structures, utility companies can adjust energy rates based on actual time-varying marginal costs, thereby providing an accurate and timely stimulus for encouraging customers to lower demand when marginal costs are high. To benefit from RTP, the consumer must have the ability to make short-term adjustments to curtail energy demand in response to periods with higher energy prices. One increasingly popular method of accomplishing this objective is by supplementing environmental conditioning systems with energy storage mediums, such as ice-storage systems. To maximize the benefits from such energy storage mediums, the consumer must have not only the ability to analyze energy demand and consumption information but also the ability to predict future load requirements.

The ability to analyze energy or utility consumption is also of critical importance in identifying abnormal consumption. Abnormal energy or utility consumption may indicate malfunctioning equipment or other problems in the building. Therefore, monitoring utility usage and detecting abnormal consumption levels can indicate when maintenance or replacement of the machinery is required.

As a consequence, sensors are being incorporated into building, management systems to measure utility usage for the entire building, as well as specific subsystems such as heating, ventilation and air conditioning equipment. These management systems collect and store massive quantities of utility consumption data which can be analyzed by the facility operator in an effort to predict future load requirements and/or detect anomalies.

In practice, it is impossible to accept data, uncritically, 24 hours a day, 365 days a year. For example, sensors and meters can fail, as can the infrastructure used to transmit the data from its point of origin to where it is logged and analyzed. Thus, whenever energy or utility consumption data is recorded there is a good chance some of it will either be lost or rejected as not valid. While some types; of summary calculations (e.g., averages) are relatively "immune" to gaps in the data, other calculations (e.g., aggregations) require a complete data set for reasonable accuracy. Thus, a utility bill cannot be calculated unless all of the consumption and demand data (either actual or estimated) is available for the billing period because of the aggregations that are required. Another problem that is unique to calculating a utility bill is that if the missing data corresponds to a period of peak demand, the amount of the utility bill can be significantly impacted.

There are numerous strategies known in the utility industry for estimating or gap filling missing consumption data. These strategies range in complexity from simple linear interpolation to higher-order curve fitting techniques based on advanced mathematics such as linear and nonlinear least squares, recursive and sequential least squares, minimum mean square error, and the like. A systematic and comprehensive treatment of rigorous methods for analyzing data with missing values is provided in *Statistical Analysis With Missing Data,* 2nd Edition, Little, R. J. A. and Rubin, D. B., New York: John Wiley (2002). However, most of these approaches work well only for relatively narrow gaps in the data. Other known problems with these techniques are they can require extensive learning periods and/or tend to be relatively poor at replicating the periodic behaivor of many signals.

In the utility industry it is also common to use standard load or usage profiles for estimating a customer's energy usage. These standard usage profiles are typically based upon the utility usage of a customer class and divided into weekday, weekend day, and holiday types. With some of these approaches, the usage profile may be adjusted for the temperature and weather observed in the recent past. Although this works well in some instances, it does not work well for customers having non-standard utility usage such as a manufacturing plant that is on four days and off three days each week. As a result, these customers may be assessed utility charges (e.g., "demand" or "consumption") that can be significantly more or less than is justified based on actual utility usage.

Accordingly, it would be advantageous to provide an improved method and system for estimating missing data over large gaps in systems having periodic behavior so that accurate summaries and other calculations can be performed. It would also be desirable to provide a method and system for computing individual usage or consumption profiles for each customer using data obtained from the sources actually being profiled so that the customer classification usage based profiles can be avoided.

SUMMARY OF THE INVENTION

The present invention relates to methods and systems that analyze energy or other utility consumption information to fill gaps in time series data. This approach relics on the observed behaivor of the data source over an extended period of time. A large sample of data is taken from the source and analyzed to identify those days that should have roughly the same consumption profile. A consumption profile is then generated for each of the day types in the data set and this information is then replicated over the missing interval. The data replicated over the gap is preferably adjusted up or down based on localized trend information to account for high or low consumption trends adjacent to the gap.

According to a first aspect of an embodiment of the present invention, a method is provided for filling a gap of missing data using source specified data. The method comprises analyzing a first set of data representative of utility consumption for a plurality of days to determine clusters of days of the week having similar utility consumption. The method further comprises generating an individual profile of utility consumption for each cluster, and copying data from at least one individual profile into the gap.

According to another aspect of an embodiment of the present invention, an apparatus for filling a gap of missing data using source specified data comprises means for analyzing a first set of data representative of utility consumption for a plurality of days to determine clusters of days of the week having similar utility consumption. The apparatus further comprises means for generating an individual profile of utility consumption for each cluster, and means for copying data from at least one individual profile into the gap.

According to a further aspect of an embodiment of the present invention, a system for filling a gap of missing data using source specified data includes a programmed microprocessor configured to analyze a first set of data representative of utility consumption for a plurality of days to determine clusters of days of the week having similar utility consumption and to generate an individual profile of utility consumption data for each cluster. The microprocessor is further configured to copy data from at least one individual profile into the gap, and adjust the copied data up or down to account for local trend information adjacent to the gap.

These and other benefits and features of embodiments of the invention will be apparent upon consideration of the following detailed description of preferred embodiments thereof, presented in connection with the following drawings in which like reference numerals are used to identify like elements throughout,

Figure 1:
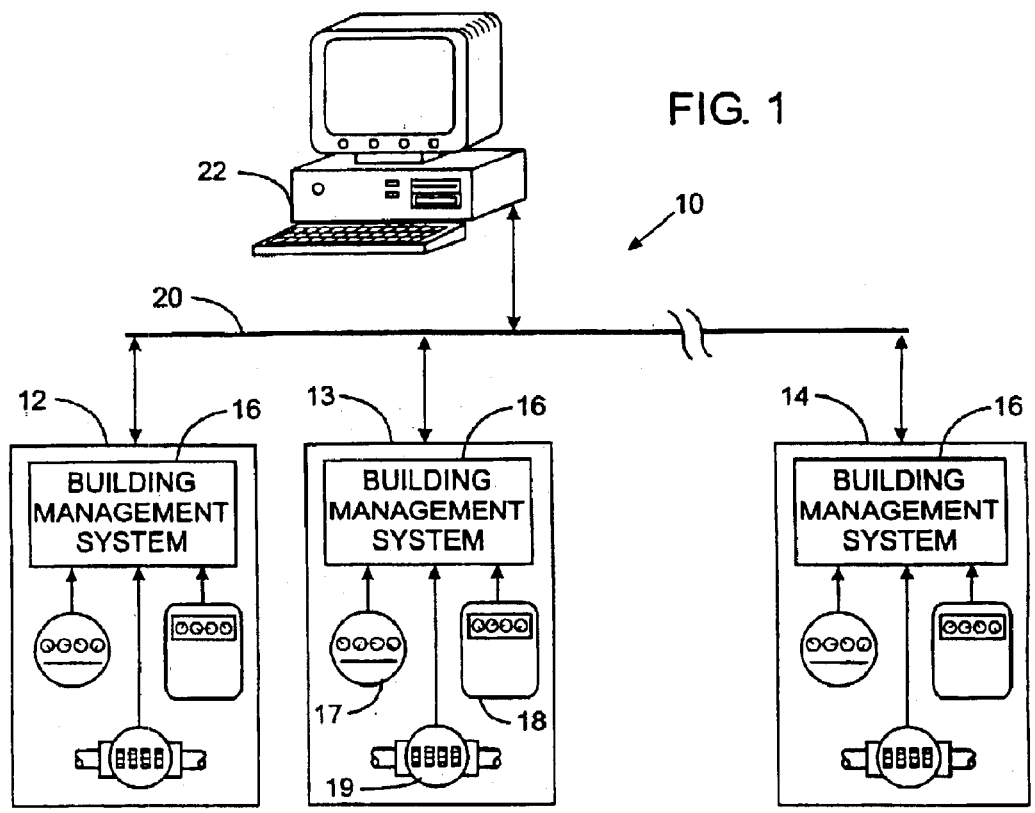
FIG. 1 is a block diagram of a distributed facility management system which incorporates a preferred embodiment of the present invention.

Before explaining a number of preferred embodiments of the invention in detail it is to be understood that the invention is not limited to the details of construction and the arrangement of the components set forth in the following description or illustrated in the drawings. The invention is capable of other embodiments or being practiced or carried out in various ways. It is also to be understood that the phraseology and terminology employed herein is for the purpose of description and should not be regarded as limiting.

DETAILED DESCRIPTION OF THE PREFERRED EMBODIMENTS

With reference to FIG. 1, a distributed facility management system 10 supervises the operation of systems in a plurality of buildings 12, 13 and 14. Each building contains its own building management system 16, which is a computer that governs the operation of various subsystems within the building. To facilitate this purpose, each building management system 16 is connected to numerous sensors positioned throughout the building to monitor consumption of different utility services at certain points of interest. For example, the building management system 16 in building 13 may be connected to a main electric meter 17, a central gas meter 18 and a main water meter 19. In addition, individual meters for electricity, gas, water and other utilities may be attached at the supply connection to specific pieces of equipment to measure their consumption. For example, water drawn into a cooling tower of an air conditioning system may be monitored, as well as the electric consumption of the pumps for that unit.

Periodically, building management system 10 gathers utility consumption data from the various sensors and stores that information in a database contained within the memory of the computer for building management system 16. The frequency at which the data is gathered is determined by the operator of the building based on the type of the data and the associated building function. In general, the utility consumption for equipment with relatively steady state operation can be sampled less frequently as compared to equipment having large variations in utility consumption. However, persons skilled in the art will recognize that the sampling time for electrical data needs to be equal to the demand interval or shorter.

The gathered data can be analyzed either locally by building management system 16 or forwarded via a communication link 20 for analysis by a centralized computer 22. Communication link 20 may be, for example, a wide area computer network extending among multiple buildings in an office park or on a university campus. Alternatively, communication link 20 may comprise telephone lines extending between individual stores and the main office of a large retailer spread throughout one or more cities and regions. If the analysis is to be performed locally, the system would typically utilize a local area network or direct cable connections for transmitting and receiving the gathered data between the various sensors, databases, computers, and other networked telecommunications equipment in the building management system 16. Of course, the local and/or remote data connections forming communication link 20 could include wireless connections as is well known in the industry.

Figure 2:
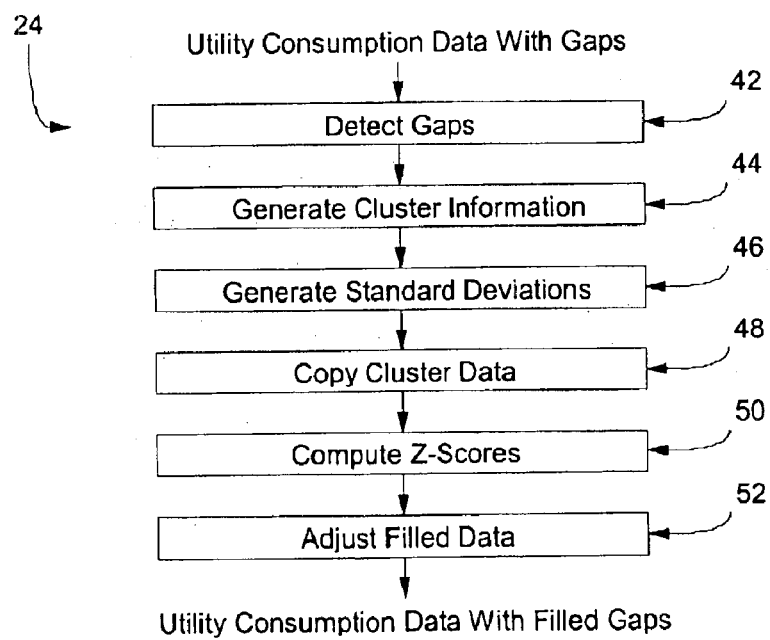
FIG. 2 shows the major components of a gap filling system for automatically detecting and filling gaps in a time series of utility consumption data.

The present invention relates to a process by which utility consumption data acquired from a group of buildings, a single building, or subcomponents of a building may be analyzed to fill any gaps in the data. FIG. 2 shows the major components of a gap filling system 24 in accordance with one preferred embodiment of the present invention. Gap filling system 24 may be a program that is resident on building management system 16 or on centralized computer 22. In either case, the input to gap filling system 24 is an incomplete time series (i.e., a time series with gaps) of building utility consumption data such as electricity use, natural gas consumption, district heating consumption, cooling requirements, heating requirements, water and the like.

Figure 3:
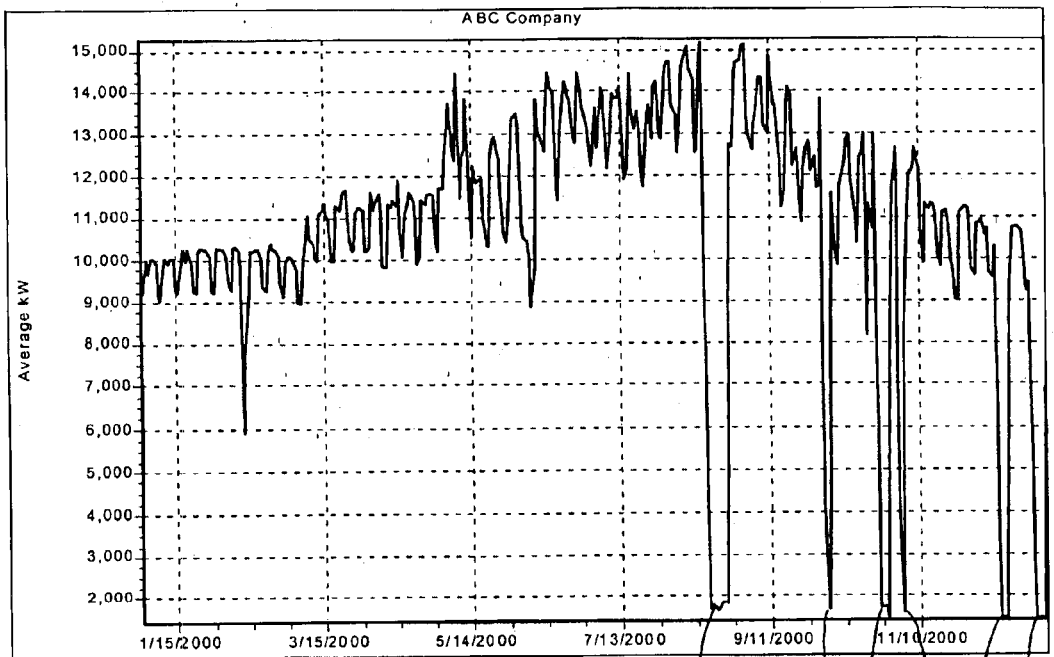
FIG. 3 is a graphic plot of an incomplete time series of utility consumption data for a plurality of buildings owned by a hypothetical ABC company.
Figure 4:
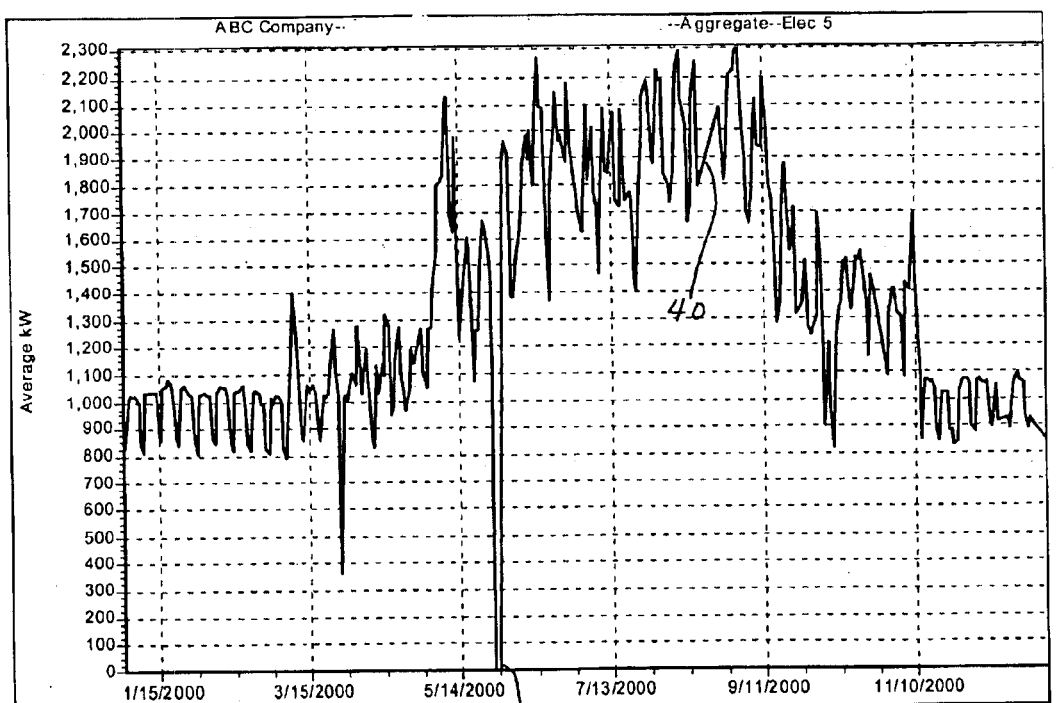
FIG. 4 is a graphic plot of an incomplete time series of utility consumption data for another building owned by ABC company.

Two examples of an incomplete time series of utility consumption data for buildings owned by a hypothetical ABC Company are graphically shown in FIGS. 3 and 4. Both figures illustrate the energy consumption (measured in kilowatts) for one or more buildings (or for certain equipment in the buildings) taken at a demand interval (e.g., every fifteen minutes or half-hour) for approximately a one year time period. In FIG. 3, the consumption data includes six gaps 26, 28, 30, 32, 34 and 36, all of which are relatively easy to detect visually. In FIG. 4, the consumption data includes one gap 38 that is easy to detect visually and another gap 40 that is comparatively more difficult to detect visually.

Before providing the details of a preferred embodiment of gap filling system 24, a brief overview of the system is provided to introduction the reader to the major elements and basic operation. As best illustrated in FIG. 2, gap filling system 24 begins with a Detect Gaps block 42 that detects gaps in the time series data and a Generate Cluster Information block 44 that analyzes a large block of data (e.g., three to six months worth surrounding the gap) to identify clusters of days with similar energy consumption profiles and to create a cluster profile for each day-type. Based on the information provided by block 44, a Generate Standard Deviations block 46 generates a single aggregate sample standard deviation for each cluster. In addition, the information provided by block 44 is used in a Copy Cluster Data block 48 to fill the gap with average consumption values for the day-type(s) in the gap. Next, a Compute Z-Scores block 50 computes certain statistics for the data immediately preceding and following each gap to determine whether the gap is adjacent a high or low energy consumption period compared to the average consumption values for the associated cluster profile(s). Finally, the statistics compiled by block 50 are utilized in an Adjust Filled Data block 52 to vertically shift the standard or average cluster data up or down to adjust for localized trend and to smooth the transition across the gap. The output of block 52 is a complete time series (i.e., a time series without any gaps) of building energy consumption data that accounts for not only the long term periodic consumption behavior of the source being monitored but also the recent consumption trend information before and after the gap. This output can be used for any purpose that is commonly made of complete time series of building utility consumption data such as analyzing energy demand and consumption information, predicting future load requirements, detecting anomalies, and the like.

Focusing on one type of utility service, such as electricity use for an entire building, the acquisition of periodic electric power measurements from main electric meter 17 produces a set of data samples at the demand interval e.g., every fifteen minutes or half hour) for every day of the week over an extended period of time (e.g., three or six months). Based on the information in this time series, gap filling system 24 is able to learn the long term periodic behavior of the system so that any gaps in the data can be filled. In addition, by analyzing data immediately surrounding the gap, system 24 is able to adjust the data up or down to account for near term increases or decreases in utility consumption. Hence, the need to rely on standard usage or load profiles derived from customer classifications as is often done in the prior art systems is eliminated. Although gap filling system 24 is described below in the context of energy usage, it will be appreciated that the system could be utilized in the context of numerous other utilities such as natural gas and water.

As explained above, gap filling system 24 begins with Detect Gaps block 42 which receives the time series data with one or more gaps therein. Whenever block 42 identifies a gap in the data, it records the date and time of the start of the gap along with the date and time of the end of the gap. This information is then passed to Generate Cluster Information block 44, which is described below and illustrated with reference to FIG. 5.

Before describing Generate Cluster Information block 44 in detail, it should be noted that block 44 preferably utilizes an automatic pattern recognition algorithm 54 that is more fully described and illustrated in co-pending and commonly owned U.S. patent application Ser. No. 10/021,382, filed Oct. 30, 2001 ("the '382 application"), the entire contents of which are hereby incorporated by reference herein. In addition, it should be noted that pattern recognition algorithm 54 is preferably performed in advance of the remaining components of gap filling system 24 so that the requisite cluster profile information is readily available whenever gap filling system 24 is run on newly received data. This can be done because pattern recognition algorithm 54 and the remaining elements of gap filling system 24 typically operate on different (although possibly overlapping) sets of data. This is also practical because the cluster profile information generated by pattern recognition system 54 tends to remain relatively constant over long periods of time and thus system 54 need be run only occasionally (e.g., a couple of times a year) to ensure gap filling system 24 remains accurate. Finally, it should be emphasized that the use of automatic pattern recognition algorithm 54 such as described in the '382 application is a preferred rather than necessary feature of gap filling system 24. As noted in the '382 application, persons skilled in the art may be able to identify days of the week having similar utility consumption profiles based on their personal knowledge of the building use, from visual analysis of data regarding daily average or peak utility consumption, or from other manual or non-automated techniques well known to persons skilled in the art. As such, the standard profiles used for operation of gap filling system 54 may be obtained by these or other techniques rather than by software that automatically determines the profile information. As persons skilled in the art will recognize, however, use of automatic pattern recognition system 54 is advantageous in that it can substantially decrease (and possibly eliminate entirely) the need for skilled building personnel to examine the data and, moreover, it allows the effects of seasonal variations to be readily detected and removed, which can be difficult even for experienced building operators to accomplish.

According to a preferred embodiment, the input to pattern recognition system 54 (see FIG. 5) is preferably a sufficient amount of time series data so that each cluster profile generated in the output of system 54 includes about 30 days worth of data. In a particularly preferred embodiment, the window of time series data used to create the cluster profiles is sufficient to provide each cluster with about 15 days worth of data immediately prior to the gap and about 15 days worth of data immediately following the gap. If there is insufficient time series data following the gap, then the window used to obtain the 30 days worth of time series data in each cluster profile is preferably shifted accordingly. If possible, the window of data used to generate the cluster profiles is preferably free of gaps and exceptions (i.e., outliers) as discussed in detail below. In the "worst case" scenario in which one or more of the clusters profiles comprises a single day, then 30 calendar weeks of data would be required to provide 30 days worth of data for that cluster. In most cases, however, significantly less data will be required to provide each cluster profile with 30 days worth of data.

Figure 5:
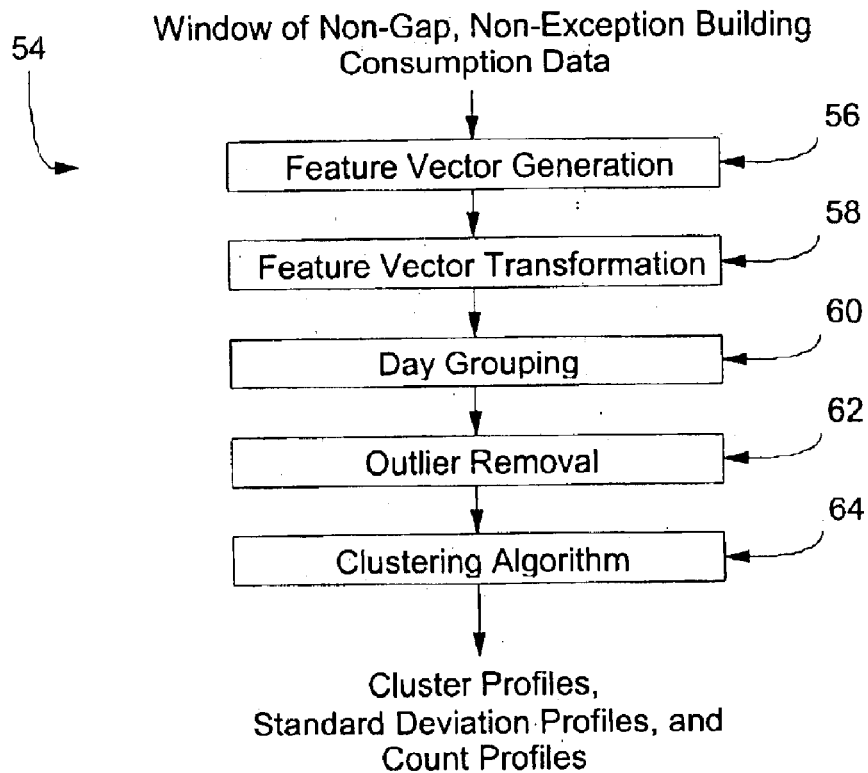
FIG. 5 shows the major components of a pattern recognition system for automatically grouping days of the week having similar energy consumption.

As illustrated in FIG. 5, the window of time series data is provided to Feature Vector Generation subblock 56 which inspects the data and identifies important energy consumption features therein. Examples of important features are the average daily energy consumption, peak energy use during a fifteen-minute interval for a one-day period, or minimum energy use over a fifteen-minute interval for a one-day period. Subblock 56 does not determine features for days when there is missing data or days that have an average or peak consumption of zero.

After execution of subblock 56, a Feature Vector Transformation subblock 58 is executed to remove the effect of seasonal energy changes in the data. Subblock 58 accomplishes this task by determining the difference between the energy consumption reading for a day and a one-week period of surrounding data for each time interval in the day. As persons skilled in the art will appreciate, this helps prevent clusters for a day of the week from being split into two distinct groups when there is a change in energy use resulting from seasonal variation.

Following execution of subblock 58, a Data Grouping subblock 60 performs a grouping operation on the transformed feature vectors by day of the week. There are seven groups, and each group contains the feature vectors for one day of the week. For each group of data, subblock 60 preferably uses only the most recent feature vectors.

Next, the grouped data is analyzed by an Outlier Removal subblock 62 which identifies and removes the outliers in each of the seven groups. As persons skilled in the art will recognize, outliers are values that differ significantly from the majority of values in a data set. For example, the number 99 may be considered an outlier in the following data set: {4, 5, 3, 6, 2, 99, 1, 5, 7}. Numerous methods have been developed to identify outliers in both single and multiple dimensions. A preferred method of outlier detection that is particularly well suited for use in subblock 62 is provided in co-pending and commonly owned U.S. patent application Ser. No. 09/910,371, the entire content of which is hereby incorporated by reference herein.

After subblock 62, a Clustering Algorithm subblock 64 determines the days of the week with similar energy consumption profiles to other days of the week. A preferred clustering algorithm that is particularly well suited for use in the pattern recognition system is provided in the above-referenced '382 application. This clustering algorithm is based on an agglomerative hierarchical clustering method which is more fully described and illustrated in the '382 application. Alternatively, numerous other clustering algorithms or grouping methods are well known in the art and could be used instead.

The output of subblock 62 includes a set of cluster profiles, one for each group of days found to have similar energy consumption usage. Each cluster profile comprises time series data for a single 24 hour day, with the value at each time slot being computed by averaging the energy consumption for that time slot over all the days in the window of data used to create the cluster. In addition, two other pertinent output profiles are provided by subblock 62, including the number of observations included in each average of the cluster profiles and the sample standard deviations for each of the averages.

To further illustrate the output provided by pattern recognition, system 54, a brief example will be given without intending to be limiting in any way. Assuming for this example that block 63 clustered the window of time series input data into three groups (e.g., Mondays, Weekends (Sat & Sun) and {Tuesday, Wednesday, Thursdays and Fridays}), then the output of system 54 would include three (3) cluster profiles, three sample standard (31 deviation profiles, and three (3) count profiles. Moreover, assuming the time series input data is based on 15 minute demand intervals, then each profile in this example would include exactly 96 values (i.e., 4 readings or time slots per hour for 24 hours).

Returning now to FIG. 2, Generate Standard Deviations block 46 preferably uses the profile information provided by block 44 to compute a single aggregate sample standard deviation for each cluster. This is accomplished by working backwards algebraically from the sample standard deviation profile for each cluster. For example, the sample standard deviation $S_{ij}$ for each time slot j in cluster i can be represented by the following formula:

$$s_{ij} = \sqrt{\frac{\sum_{k=1}^{n_{ij}} (x_{ijk} - \bar{x}_{ij})^2}{n_{ij} - 1}} \quad (1)$$

where $X_{ijk}$ is the $k^{th}$ observation for cluster i at the $j^{th}$ time slot, $\bar{x}_{ij}$ is the average of all the observations at the $j^{th}$ time slot used to create cluster i, and $n_{ij}$ is the number of observations at the $j^{th}$ time slot used to create cluster i. Thus, the sample standard deviation $S_{ij}$ in each time slot j of cluster i can be converted into a variance $S_{ij}^2$ by squaring equation (1) as follows:

$$s_{ij}^2 = \frac{\sum_{k=1}^{n_{ij}} (x_{ijk} - \bar{x}_{ij})^2}{n_{ij} - 1}. \quad (2)$$

Next, the variance $S_{ij}^2$ each time slot j in cluster i can be converted into a sum of differences squared $$\sum_{k=1}^{n_{ij}} (x_{ijk} - \bar{x}_{ij})^2$$

by multiplying the variance $S_{ij}^2$ by the number of observations $n_{ij}$ in the standard deviation at time slot j−1 in cluster i. Next, an aggregate variance $S_i^2$ for cluster i can be computed by aggregating the sums of differences squared associated with cluster i and dividing the result by the total number of observations used to create each cluster i as follows:

$$s_i^2 = \frac{\sum_{j=1}^{n_S}\sum_{k=1}^{n_{ij}}(x_{ijk}-\overline{x}_{ij})^2}{\left(\sum_{j=1}^{n_S}n_{ij}\right)-1} \quad (3)$$

where $n_s$ is the total number of time slots in cluster i. Finally, a single aggregate sample standard deviation $S_i$ for cluster i can be obtained by taking the square root of equation (3) as follows:

$$s_i = \sqrt{\frac{\sum_{j=1}^{n_S}\sum_{k=1}^{n_{ij}}(x_{ijk}-\overline{x}_{ij})^2}{\left(\sum_{j=1}^{n_S}n_{ij}\right)-1}} \quad (4)$$

Similar calculations can of course be performed to obtain the aggregate standard deviations for the remaining clusters.

Continuing now with the description of gap filling system 24 in connection with FIG. 2, the cluster profiles generated by block 44 are used in Copy Cluster Data block 48 to provide average energy consumption values for the day-type (s) in the gap.

This data copying operation can best be explained with reference to the following example in which it is assumed that block 44 has already inspected a window of consumption data (e.g.; a window of enough days surrounding the gap to preferably provide about 15 days worth of data in each cluster both before and after the gap) and identified from this time series data three (3) distinct clusters or day-types as follows: Mondays, Weekends (Sat & Sun) and {Tuesdays, Wednesdays, Thursdays and Fridays}). Continuing with this example, if block 48 were to determine that a gap starts at 0915 hours (i.e., 9:15 AM) on Thursday June 1 and ends at 1730 hours (i.e., 5:30 PM) on Monday June 5, the gap would be filled by block 48 as follows. First, block 48 would fill the time slots between 0930 and 2345 on Thursday June 1 with the average consumption values taken from the corresponding time slots in the {Tuesdays, Wednesdays, Thursdays and Fridays} day-type cluster profile. Next, block 48 would fill all the time slots on Friday June 2 with the average consumption values taken from the corresponding time slots in the {Tuesdays, Wednesdays, Thursdays and Fridays} day-type cluster profile. In addition, block 48 would fill all the time slots on Saturday and Sunday June 3 and 4 with the average consumption values taken from the corresponding time slots in the Weekend day-type cluster profile. Finally, block 48 would fill the time slots between 2400 (i.e., midnight) and 1730 on Monday June 5 with the average consumption values taken from the corresponding time slots of the Monday day-type cluster profile.

At the conclusion of block 48, the gap is entirely filled with average time series data for the day-type(s) in the gap. However, persons skilled in the art will recognize that the data copied into the gap by block 48 does not fully account for recent (or short term) trend information immediately prior to or following the gap that may evidence a high or low energy consumption trend. This adjustment is made by the final two blocks in system 24.

In Compute Z-Scores block 50, the time series data immediately preceding and following the gap is analyzed to determine certain statistics which are used in Adjust Filled Data block 52 to shift the recently copied data up or down to account for trends evidenced by the edges of the gap. As persons skilled in the art will appreciate, a number that indicates how many standard deviations from the mean a particular observation lies is known as a z-score. According to a preferred embodiment, block 50 computes a starting z-score for a window of data immediately preceding the gap (known as the "pre-gap" data), an ending z-score for a window of data immediately following the gap (known as the "post-gap" data), and a plurality of intermediate z-scores that span across the gap. In a particularly preferred embodiment, the pre-gap data comprises one day's worth of data immediately prior to the gap and the post-gap data comprises one day's worth of data immediately following the gap. Thus, if the time series data is taken in fifteen minute increments, the pre-gap data and post-gap data will each comprise exactly 96 data points (i.e., 4 observations or time slots per hour for a 24 hour period). Preferably, the pre-gap and post-gap data are both free of exceptions and gaps.

Figure 6:
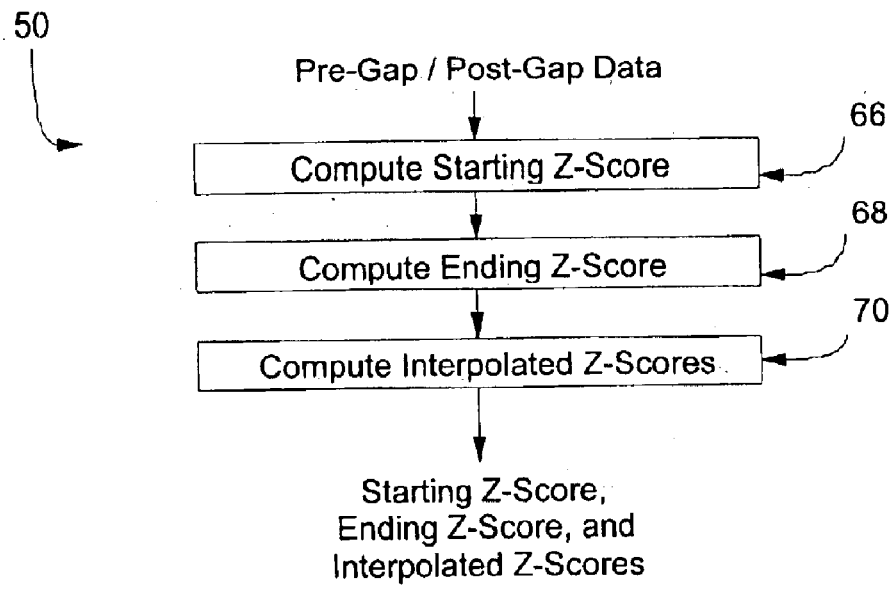
FIG. 6 shows the major components of a system for determining a plurality of z-scores that can be used for adjusting gap filled data upward or downward to adjust for localized trend.

FIG. 6 illustrates the details of block 50 for an exemplary embodiment. In this embodiment, a Compute Starting Z-Score subblock 66 begins by computing a z-score $Z_i$ for each time slot i in the pre-gap data using the following formula:

$$Z_i = \frac{x_i - \overline{x}_i}{s_i} \quad (5)$$

where $x_i$ is the observation at the $i^{th}$ time slot in the pre-gap data, $\overline{x}_i$ is the average value stored in the $i^{th}$ time slot of the cluster profile corresponding to the day-type of $x_i$, and $S_i$ is the single aggregate sample standard deviation for the associated cluster profile corresponding to the day-type of $x_i$. In addition, block 66 computes a single aggregate starting z-score $\overline{Z}_{start}$ for all of the pre-gap data by averaging the plurality of z-scores $Z_i$ corresponding to the individual time slots of pre-gap data.

Block 50 also includes a Compute Ending Z-Score subblock 68 that computes a single aggregate ending z-score $\overline{Z}_{end}$ for all the post-gap data using the same methodology as described above for subblock 66 and the pre-gap data. If there is no post-gap data, the ending z-score is set equal to the starting z-score.

Finally, block 50 includes a Compute Interpolated Z-Scores subblock 70 that computes a plurality of interpolated z-scores, one for each time slot or increment in the gap. According to an exemplary embodiment, the estimated z-scores $\hat{Z}_j$ across the gap are determined by subblock 70 using linear interpolation as follows:

$$\hat{Z}_j = \overline{Z}_{start} + j \cdot \overline{Z}_{step} \quad (6)$$

where $\overline{Z}_{step}$ is equal to the change in z-score values (i.e., the ending z-score $\overline{Z}_{end}$ minus the starting z-score $\overline{Z}_{start}$) divided by the gap width (i.e., the total number of time slots or increments needed to completely span the gap) and j ranges from 1 to the number of time slots in the gap.

Returning now to FIG. 2, gap filling system 24 concludes with Adjust Filled Data block 52. Block 52 utilizes the starting, ending and interpolated z-scores to vertically shift the gap filled data up or down to adjust the standard or average data values in the gap for localized trend information evidenced by the time series data at the edges of the gap. This is accomplished in block 52 by multiplying the interpolated z-score $\hat{Z}_j$ for each time slot by the standard deviation for that time slot (i.e., the value from the corresponding standard deviation profile and time increment) and adding the result to the value already copied into the time slot by block 48. As persons skilled in the art will appreciate, this operation results in the average or standard profile values copied into the time slots of the gap by block 48 (i.e., the values in the cluster profiles which are based on long term trend analysis) being shifted up or down to reflect whether the source being monitored is in a low or high utility consumption trend adjacent to the gap (as determined by the statistics compiled by block 50).

As persons skilled in the art will recognize, the foregoing methodology results in the gap being filled with estimated time series data that accounts for both the periodic behaivor of the system and the short term trend adjacent to the gap. Hence, the filled data will generally be more accurate than data generated by prior art techniques that fail to take account of the long term periodic consumption behavior of the source or the near term trend information. Moreover, the above-described embodiments of the present invention are particularly advantageous in that they utilize relatively simple mathematics and short processing time to accomplish as compared to prior art techniques.

It is important to note that the above-described preferred embodiments of the gap filling algorithm are illustrative only. Although the invention has been described in conjunction with specific embodiments thereof, those skilled in the art will appreciate that numerous modifications are possible without materially departing from the novel teachings and advantages of the subject matter described herein. For example, although the invention is illustrated using a particular method for clustering, a different clustering algorithm could be used. As another example, although the invention is illustrated above using electrical energy as the utility being consumed, the invention applies equally well to other types of utilities such as water and gas. Accordingly, these and all other such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present invention.

What is claimed is:

1. A method for filling a gap of missing data using source specified data, comprising:

analyzing a first set of data representative of utility consumption for a plurality of days to determine clusters of days of the week having similar utility consumption;

generating an individual profile of utility consumption for each cluster;

copying data from at least one individual profile into the gap to form a second set of data without any gaps; and identifying and removing abnormal utility consumption data from the first series of data, wherein the identifying and removing step includes performing an outlier analysis on the data.

2. The method of claim 1, further including a step of gathering the first set of data using at least one sensor.

3. The method of claim 2, further including positioning the at least one sensor to monitor at least one of an electric meter, a gas meter, a water meter and a supply connection to a specific piece of equipment.

4. The method of claim 1, wherein the utility being consumed is at least one of electricity, gas and water.

5. The method of claim 1, further including reading the first set of data from a database contained within a memory of a computerized system.

6. The method of claim 1, further including receiving the data via a communication link.

7. The method of claim 6, wherein the communication link is at least one of a direct cable connection, a local area network, a wide area network, a telephone line, and a wireless connection.

8. The method of claim 1, wherein the first series of data is a time series of building utility consumption data.

9. The method of claim 8, wherein the building utility consumption data is at least one of electricity use, natural gas consumption, district heating consumption, cooling requirements, and heating requirements.

10. A method for filling a gap of missing data using source specified data, comprising:

analyzing a first set of data representative of utility consumption for a plurality of days to determine clusters of days of the week having similar utility consumption;

generating an individual profile of utility consumption for each cluster; and copying data from at least one individual profile into the gap to form a second set of data without any gaps, wherein the analyzing step includes performing a clustering algorithm.

11. The method of claim 10, wherein the clustering algorithm comprises a form of an agglomerative hierarchical clustering method.

12. A method for filling a gap of missing data using source specified data, comprising:

analyzing a first set of data representative of utility consumption for a plurality of days to determine clusters of days of the week having similar utility consumption;

generating an individual profile of utility consumption for each cluster; and copying data from at least one individual profile into the gap to form a second set of data without any gaps, wherein the copying step includes adjusting the individual profile using statistics computed from data adjacent to the gap.

13. The method of claim 12, wherein the step of adjusting the individual profile is accomplished by computing at least one statistical Z-score for data adjacent to the gap.

14. The method of claim 13, wherein computing the at least one statistical Z-score comprises determining a starting Z-score for pre-gap data and determining an ending Z-score for post-gap data.

15. The method of claim 14, further comprising computing a plurality of interpolated Z-scores between the starting and ending Z-scores using linear interpolation.

16. The method of claim 12, wherein the data adjacent to the gap comprises at least one of pre-gap data immediately before the gap and post-gap data immediately after the gap.

17. The method of claim 16, wherein the at least one of pre-gap data and post-gap data comprises one day's worth of data before or after the gap, or one day each before and after the gap.

18. A method for filling a gap of missing data using source specified data, comprising:

analyzing a first set of data representative of utility consumption for a plurality of days to determine clusters of days of the week having similar utility consumption;

generating an individual profile of utility consumption for each cluster; and copying data from at least one individual profile into the gap to form a second set of data without any gaps, wherein the first set of data is a time series of sufficient duration that each individual profile includes about 15 days worth of data prior to the gap and about 15 days worth of data following the gap.

19. The method of claim 18, further including the step of increasing the size of the window prior to the gap when insufficient data is available following the gap.

20. A method for filling a gap of missing data using source specified data, comprising:

analyzing a first set of data representative of utility consumption for a plurality of days to determine clusters of days of the week having similar utility consumption;

generating an individual profile of utility consumption for each cluster;

copying data from at least one individual profile into the gap to form a second set of data without any gaps; and displaying the second set of data on a display using indicia to distinguish the copied data.

21. The method of claim 20, wherein the distinguishing indicia includes at least one of color, line thickness, labels, and emphasis.

22. A method for filling a gap of missing data using source specified data, comprising:

analyzing a first set of data representative of utility consumption for a plurality of days to determine clusters of days of the week having similar utility consumption;

generating an individual profile of utility consumption for each cluster;

copying data from at least one individual profile into the gap to form a second set of data without any gaps; and performing summary calculations on the second set of data including the copied data.

23. The method of claim 22, wherein the summary calculations include at least one of a demand charge, a time of day charge, and a consumption charge.

24. The method of claim 22, wherein the summary calculations include at least one of aggregation and averaging.

25. An apparatus for filling a gap of missing data using source specified data, comprising:

means for analyzing a first set of data representative of utility consumption for a plurality of days to determine clusters of days of the week having similar utility consumption;

means for generating an individual profile of utility consumption for each cluster; and means for copying data from at least one individual profile into the gap to form a second set of data without any gaps, wherein the means for analyzing comprises a microprocessor programmed to perform a clustering algorithm.

26. The apparatus of claim 25, wherein the clustering algorithm comprises a form of an agglomerative hierarchical clustering method.

27. An apparatus for filling a gap of missing data using source specified data, comprising:

means for analyzing a first set of data representative of utility consumption for a plurality of days to determine clusters of days of the week having similar utility consumption;

means for generating an individual profile of utility consumption for each cluster; and means for copying data from at least one individual profile into the gap to form a second set of data without any gaps, wherein the means for copying includes means for adjusting the individual profile using statistics computed from data adjacent to the gap.

28. The apparatus of claim 27, wherein the means for adjusting the individual profile includes a microprocessor programmed to compute at least one statistical Z-score for data adjacent to the gap.

29. The apparatus of claim 28, wherein the microprocessor is programmed to determine a starting Z-score for pre-gap data and an ending Z-score for post-gap data.

30. The apparatus of claim 29, wherein the microprocessor is programmed to determine a plurality of interpolated Z-scores between the starting and ending Z-scores using linear interpolation.

31. The apparatus of claim 28, wherein the data adjacent to the gap comprises at least one of pre-gap data immediately before the gap and post-gap data immediately after the gap.

32. The apparatus of claim 31, wherein the at least one of pre-gap data and post-gap data comprises one day's worth of data before or after the gap, or one day each before and after the gap.

33. An apparatus for filling a gap of missing data using source specified data, comprising:

means for analyzing a first set of data representative of utility consumption for a plurality of days to determine clusters of days of the week having similar utility consumption;

means for generating an individual profile of utility consumption for each cluster; and means for copying data from at least one individual profile into the gap to form a second set of data without any gaps, wherein the first set of data is a time series of sufficient duration that each individual profile includes about 15 days worth of data prior to the gap and about 15 days worth of data following the gap.

34. A system for filling a gap of missing data using source specified data, the system comprising:

a programmed microprocessor configured to analyze a first set of data representative of utility consumption for a plurality of days to determine clusters of days of the week having similar utility consumption and to generate an individual profile of utility consumption data for each cluster, the microprocessor further configured to, copy data from at least one individual profile into the gap; and adjust the copied data up or down to account for local trend information adjacent to the gap.

35. The system of claim 34, wherein the microprocessor is programmed to obtain the local trend information from time series data immediately prior to and/or following the gap.

36. The system of claim 34, wherein the microprocessor is programmed to obtain the local trend information by determining at least one statistical Z-score for data adjacent to the gap.

37. The system of claim 36, wherein the microprocessor is programmed to determine a starting Z-score for pre-gap data and an ending Z-score for post-gap data.

38. The system of claim 37, wherein the microprocessor is programmed to determine a plurality of interpolated Z-scores between the starting and ending Z-scores using linear interpolation.

39. The system of claim 34, wherein the local trend information is based on approximately one day's worth of data preceding the gap and approximately one day's worth of data following the gap.

40. A method for filling a gap of missing data using source specified data, comprising:
- analyzing a first set of data representative of utility consumption for a plurality of days to determine clusters of days of the week having similar utility consumption;
- generating an individual profile of utility consumption for each cluster; and
- copying data from at least one individual profile into the gap to form a second set of data without any gaps, wherein copying data includes adjusting the individual profile using at least one statistical Z-score computed for data adjacent to the gap.

41. The method of claim 40, wherein computing the at least one statistical Z-score comprises determining a starting Z-score for pre-gap data and determining an ending Z-score for post-gap data.

42. The method of claim 41, further comprising computing a plurality of interpolated Z-scores between the starting and ending Z-scores using linear interpolation.

43. The method of claim 40, wherein the data adjacent to the gap comprises at least one of pre-gap data immediately before the gap and post-gap data immediately after the gap.

44. The method of claim 43, wherein the at least one of pre-gap data and post-gap data comprises one day's worth of data before or after the gap, or one day each before and after the gap.

45. A method for filling a gap of missing data using source specified data, comprising:
- analyzing a first set of data representative of utility consumption for a plurality of days to determine clusters of days of the week having similar utility consumption, wherein the first set of data is a time series of sufficient duration that each individual profile includes about 15 days worth of data prior to the gap and about 15 days worth of data following the gap;
- generating an individual profile of utility consumption for each cluster; and
- copying data from at least one individual profile into the gap to form a second set of data without any gaps.

46. The method of claim 45, further including the step of increasing the size of the window prior to the gap when insufficient data is available following the gap.

47. A method for filling a gap of missing data using source specified data, comprising:
- analyzing a first set of data representative of utility consumption for a plurality of days to determine clusters of days of the week having similar utility consumption;
- generating an individual profile of utility consumption for each cluster;
- copying data from at least one individual profile into the gap to form a second set of data without any gaps; and
- displaying the second set of data on a display using indicia to distinguish the copied data.

48. The method of claim 47, wherein the distinguishing indicia includes at least one of color, line thickness, labels, and emphasis.

49. A method for filling a gap of missing data using source specified data, comprising:
- analyzing a first set of data representative of utility consumption for a plurality of days to determine clusters of days of the week having similar utility consumption;
- generating an individual profile of utility consumption for each cluster;
- copying data from at least one individual profile into the gap to form a second set of data without any gaps; and
- performing summary calculations on the second set of data including the copied data.

50. The method of claim 49, wherein the summary calculations include at least one of a demand charge, a time of day charge, and a consumption charge.

51. The method of claim 49, wherein the summary calculations include at least one of aggregation and averaging.

52. An apparatus for filling a gap of missing data using source specified data, comprising:
- means for analyzing a first set of data representative of utility consumption for a plurality of days to determine clusters of days of the week having similar utility consumption;
- means for generating an individual profile of utility consumption for each cluster; and
- means for copying data from at least one individual profile into the gap to
- form a second set of data without any gaps, wherein the means for copying includes means for adjusting the individual profile using statistics computed from data adjacent to the gap, and wherein the means for adjusting the individual profile includes a microprocessor programmed to compute at least one statistical Z-score for data adjacent to the gap.

53. The apparatus of claim 52, wherein the microprocessor is programmed to determine a starting Z-score for pre-gap data and an ending Z-score for post-gap data.

54. The apparatus of claim 53, wherein the microprocessor is programmed to determine a plurality of interpolated Z-scores between the starting and ending Z-scores using linear interpolation.

55. The apparatus of claim 52, wherein the data adjacent to the gap comprises at least one of pre-gap data immediately before the gap and post-gap data immediately after the gap.

56. The apparatus of claim 55, wherein the at least one of pre-gap data and post-gap data comprises one day's worth of data before or after the gap, or one day each before and after the gap.

57. An apparatus for filling a gap of missing data using source specified data, comprising:
- means for analyzing a first set of data representative of utility consumption for a plurality of days to determine clusters of days of the week having similar utility consumption, wherein the first set of data is a time series of sufficient duration that each individual profile includes about 15 days worth of data prior to the gap and about 15 days worth of data following the gap;
- means for generating an individual profile of utility consumption for each cluster; and
- means for copying data from at least one individual profile into the gap to form a second set of data without any gaps.

58. A system for filling a gap of missing data using source specified data, the system including a programmed microprocessor configured to analyze a first set of data representative of utility consumption for a plurality of days to determine clusters of days of the week having similar utility consumption and to generate an individual profile of utility consumption data for each cluster, the microprocessor further configured to:

copy data from at least one individual profile into the gap; and adjust the copied data up or down to account for local trend information adjacent to the gap, wherein the microprocessor is programmed to obtain the local trend information from time series data immediately prior to and/or following the gap.

59. A system for filling a gap of missing data using source specified data, the system including a programmed microprocessor configured to analyze a first set of data representative of utility consumption for a plurality of days to determine clusters of days of the week having similar utility consumption and to generate an individual profile of utility consumption data for each cluster, the microprocessor further configured to:

copy data from at least one individual profile into the gap; and adjust the copied data up or down to account for local trend information adjacent to the gap, wherein the microprocessor is programmed to obtain the local trend information by determining at least one statistical Z-score for data adjacent to the gap.

60. The system of claim 59, wherein the microprocessor is programmed to determine a starting Z-score for pre-gap data and an ending Z-score for post-gap data.

61. The system of claim 60, wherein the microprocessor is programmed to determine a plurality of interpolated Z-scores between the starting and ending Z-scores using linear interpolation.

62. A system for filling a gap of missing data using source specified data, the system including a programmed microprocessor configured to analyze a first set of data representative of utility consumption for a plurality of days to determine clusters of days of the week having similar utility consumption and to generate an individual profile of utility consumption for each cluster, the microprocessor further configured to:

copy data from at least one individual profile into the gap; and adjust the copied data up or down to account for local trend information adjacent to the gap, wherein the local trend information is based on approximately one day's worth of data preceding the gap and approximately one day's worth of data following the gap.

* * * * *